US008387862B2

(12) United States Patent
Mueller et al.

(10) Patent No.: US 8,387,862 B2
(45) Date of Patent: Mar. 5, 2013

(54) ELECTRONIC IMAGE CASH LETTER VALIDATION

(75) Inventors: Randall Lee Mueller, Kansas City, MO (US); Jeannine M. DeLano, Scituate, MA (US); Steven Q. Purser, Plano, TX (US); V. Srinivas Nori, Norcross, GA (US); Thomas Edwin Schaadt, Westerville, OH (US); Jeffrey F. Schiele, Atlanta, GA (US); Ronald Ray Mason, Bonner Springs, KS (US)

(73) Assignees: Federal Reserve Bank of Dallas, Dallas, TX (US); Federal Reserve Bank of Cleveland, Cleveland, OH (US); Federal Reserve Bank of Atlanta, Atlanta, GA (US); Federal Reserve Bank of Kansas City, Kansas City, MO (US); Federal Reserve Bank of Boston, Boston, MA (US)

( * ) Notice: Subject to any disclaimer, the term of this patent is extended or adjusted under 35 U.S.C. 154(b) by 1206 days.

(21) Appl. No.: 11/803,887

(22) Filed: May 16, 2007

(65) Prior Publication Data
US 2008/0006687 A1    Jan. 10, 2008

Related U.S. Application Data

(60) Provisional application No. 60/801,025, filed on May 17, 2006.

(51) Int. Cl.
*G06Q 40/00* (2012.01)
(52) U.S. Cl. ..................................................... 235/379
(58) Field of Classification Search .................. 235/379, 235/380
See application file for complete search history.

(56) References Cited

U.S. PATENT DOCUMENTS

| | | |
|---|---|---|
| 4,264,808 A | 4/1981 | Owens et al. |
| 4,270,042 A | 5/1981 | Case |
| 4,523,330 A | 6/1985 | Cain |
| 4,694,397 A | 9/1987 | Grant et al. |
| 4,823,264 A | 4/1989 | Deming |
| 4,948,174 A | 8/1990 | Thomson et al. |
| 4,974,878 A | 12/1990 | Josephson |
| 5,038,283 A | 8/1991 | Caveney |
| 5,120,944 A | 6/1992 | Kern et al. |
| 5,121,945 A | 6/1992 | Thomson et al. |
| 5,187,750 A | 2/1993 | Behera |
| 5,198,975 A | 3/1993 | Baker et al. |
| 5,237,159 A | 8/1993 | Stephens et al. |

(Continued)

OTHER PUBLICATIONS

Excerpt of Bank of America checking account statement, with personal information redacted, Aug. 2008.

(Continued)

*Primary Examiner* — Thien M Le
*Assistant Examiner* — Christopher Stanford
(74) *Attorney, Agent, or Firm* — King & Spalding

(57) ABSTRACT

Validating image cash letter ("ICL") files using appropriate validation standards for each ICL file and, where appropriate, allowing successfully validated elements of an ICL file containing one or more unsuccessfully validated elements to be processed for payment and/or presentment. A processing entity can receive an ICL file with multiple ICLs that each includes multiple bundles of electronic check items from a customer. The processing entity can validate the ICL file using multiple validation rules selected based on a file type of the ICL file, data content of the ICL file, and/or an identity of a bank associated with the ICL file. The processing entity can transmit a report of the validation results to the customer. The processing entity can select certain successfully validated elements of the ICL file for check presentment and/or payment processing.

37 Claims, 5 Drawing Sheets

U.S. PATENT DOCUMENTS

| | | | |
|---|---|---|---|
| 5,265,007 A | 11/1993 | Barnhard, Jr. et al. | |
| 5,373,550 A | 12/1994 | Campbell et al. | |
| 5,412,190 A | 5/1995 | Josephson et al. | |
| 5,583,759 A | 12/1996 | Geer | |
| 5,600,732 A | 2/1997 | Ott et al. | |
| 5,668,897 A | 9/1997 | Stolfo | |
| 5,677,955 A | 10/1997 | Doggett et al. | |
| 5,680,611 A | 10/1997 | Rail et al. | |
| 5,687,250 A | 11/1997 | Curley et al. | |
| 5,689,579 A * | 11/1997 | Josephson | 382/137 |
| 5,692,065 A | 11/1997 | Prakash et al. | |
| 5,754,674 A | 5/1998 | Ott et al. | |
| 5,783,808 A | 7/1998 | Josephson | |
| 5,790,717 A | 8/1998 | Judd | |
| 5,819,236 A | 10/1998 | Josephson | |
| 5,832,140 A | 11/1998 | Stapleton et al. | |
| 5,930,778 A | 7/1999 | Geer | |
| 5,937,084 A | 8/1999 | Crabtree et al. | |
| 5,940,524 A | 8/1999 | Murayama et al. | |
| 5,963,654 A | 10/1999 | Prakash et al. | |
| 6,019,282 A | 2/2000 | Thompson et al. | |
| 6,097,834 A | 8/2000 | Krouse et al. | |
| 6,115,509 A | 9/2000 | Yeskel | |
| 6,170,744 B1 | 1/2001 | Lee et al. | |
| 6,236,756 B1 | 5/2001 | Kimura et al. | |
| 6,243,689 B1 | 6/2001 | Norton | |
| 6,351,546 B1 | 2/2002 | Murayama et al. | |
| 6,351,553 B1 | 2/2002 | Hayosh | |
| 6,450,403 B1 | 9/2002 | Martens et al. | |
| 6,571,000 B1 | 5/2003 | Rasmussen et al. | |
| 6,577,761 B1 | 6/2003 | Kanno et al. | |
| 6,585,775 B1 | 7/2003 | Cosentino et al. | |
| 6,658,139 B1 | 12/2003 | Cookingham et al. | |
| 6,717,592 B2 | 4/2004 | Gusler et al. | |
| 6,792,133 B2 | 9/2004 | Ott et al. | |
| 6,850,950 B1 | 2/2005 | Clarke et al. | |
| 6,854,656 B2 | 2/2005 | Matsumori | |
| 6,912,297 B2 | 6/2005 | Scott et al. | |
| 6,963,885 B2 | 11/2005 | Calkins et al. | |
| 6,996,263 B2 | 2/2006 | Jones et al. | |
| 7,000,828 B2 | 2/2006 | Jones | |
| 7,066,668 B2 | 6/2006 | Sandison et al. | |
| 7,066,669 B2 | 6/2006 | Lugg | |
| 7,082,216 B2 | 7/2006 | Jones et al. | |
| 7,092,560 B2 | 8/2006 | Jones et al. | |
| 7,099,845 B2 | 8/2006 | Higgins et al. | |
| 7,120,606 B1 | 10/2006 | Ranzini et al. | |
| 7,167,580 B2 | 1/2007 | Klein et al. | |
| 7,283,656 B2 | 10/2007 | Blake et al. | |
| 7,386,511 B2 | 6/2008 | Buchanan et al. | |
| 7,539,646 B2 | 5/2009 | Gilder et al. | |
| 7,546,275 B1 | 6/2009 | Herzberg et al. | |
| 2001/0039534 A1 | 11/2001 | Keene | |
| 2001/0051921 A1 | 12/2001 | Garner, IV et al. | |
| 2002/0150279 A1 | 10/2002 | Scott et al. | |
| 2003/0158811 A1 | 8/2003 | Sanders et al. | |
| 2003/0202690 A1 | 10/2003 | Jones et al. | |
| 2003/0208421 A1 | 11/2003 | Vicknair et al. | |
| 2003/0225704 A1 | 12/2003 | Park et al. | |
| 2004/0030621 A1 | 2/2004 | Cobb | |
| 2004/0068464 A1 | 4/2004 | Buchanan et al. | |
| 2004/0109596 A1 | 6/2004 | Doran | |
| 2004/0133516 A1 | 7/2004 | Buchanan et al. | |
| 2004/0143621 A1 | 7/2004 | Fredrickson et al. | |
| 2004/0148235 A1 | 7/2004 | Craig et al. | |
| 2004/0181485 A1 | 9/2004 | Finch et al. | |
| 2004/0218203 A1 | 11/2004 | Mastie et al. | |
| 2004/0236688 A1 | 11/2004 | Bozeman | |
| 2005/0018896 A1 | 1/2005 | Heit et al. | |
| 2005/0044043 A1 | 2/2005 | Gooding et al. | |
| 2005/0071283 A1 | 3/2005 | Randle et al. | |
| 2005/0080719 A1 | 4/2005 | Sellen et al. | |
| 2005/0080738 A1 | 4/2005 | Sellen et al. | |
| 2005/0086136 A1 | 4/2005 | Love et al. | |
| 2005/0097046 A1 | 5/2005 | Singfield | |
| 2005/0097050 A1 | 5/2005 | Orcutt | |
| 2005/0109833 A1 | 5/2005 | Page | |
| 2005/0129300 A1 | 6/2005 | Sandison et al. | |
| 2005/0139670 A1 | 6/2005 | McGlamery et al. | |
| 2005/0144131 A1 | 6/2005 | Aziz | |
| 2005/0171899 A1 | 8/2005 | Dunn et al. | |
| 2005/0175221 A1 | 8/2005 | Scott et al. | |
| 2005/0203857 A1 | 9/2005 | Friedman | |
| 2005/0211763 A1 | 9/2005 | Sgambati et al. | |
| 2005/0213805 A1 | 9/2005 | Blake et al. | |
| 2005/0220324 A1 | 10/2005 | Klein et al. | |
| 2005/0238252 A1 | 10/2005 | Prakash et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2005/0252960 A1 | 11/2005 | Murata | |
| 2005/0256839 A1 | 11/2005 | Leong et al. | |
| 2005/0281448 A1 | 12/2005 | Lugg | |
| 2006/0006222 A1 | 1/2006 | Brey et al. | |
| 2006/0023930 A1 | 2/2006 | Patel et al. | |
| 2006/0045321 A1 | 3/2006 | Yu | |
| 2006/0045600 A1 | 3/2006 | Lugg | |
| 2006/0080245 A1 | 4/2006 | Bahl et al. | |
| 2006/0106717 A1 | 5/2006 | Randle et al. | |
| 2006/0112013 A1 | 5/2006 | Maloney | |
| 2006/0118613 A1 | 6/2006 | McMann et al. | |
| 2006/0133277 A1 | 6/2006 | Carozza et al. | |
| 2006/0167784 A1 | 7/2006 | Hoffberg | |
| 2006/0182331 A1 | 8/2006 | Gilson et al. | |
| 2006/0182332 A1 | 8/2006 | Weber | |
| 2006/0184441 A1 | 8/2006 | Haschka et al. | |
| 2006/0186194 A1 | 8/2006 | Richardson et al. | |
| 2006/0188310 A1 | 8/2006 | Sandison et al. | |
| 2006/0188311 A1 | 8/2006 | Lugg | |
| 2006/0191998 A1 | 8/2006 | Mueller et al. | |
| 2006/0206427 A1 | 9/2006 | Love et al. | |
| 2006/0212391 A1 | 9/2006 | Norman et al. | |
| 2006/0229987 A1 | 10/2006 | Leekley | |
| 2006/0237526 A1 | 10/2006 | Mueller et al. | |
| 2006/0248009 A1 | 11/2006 | Hicks et al. | |
| 2006/0280354 A1 | 12/2006 | Murray | |
| 2007/0095888 A1 | 5/2007 | Mueller et al. | |
| 2007/0100672 A1 | 5/2007 | McBrida et al. | |
| 2007/0156438 A1 | 7/2007 | Popadic et al. | |
| 2007/0235518 A1 | 10/2007 | Mueller et al. | |
| 2007/0244782 A1 | 10/2007 | Chimento | |
| 2007/0288382 A1 | 12/2007 | Narayanan et al. | |
| 2008/0097899 A1 | 4/2008 | Jackson et al. | |
| 2008/0103790 A1 | 5/2008 | Abernethy et al. | |
| 2008/0159655 A1 | 7/2008 | Breeden | |
| 2008/0162319 A1 | 7/2008 | Breeden et al. | |
| 2008/0162320 A1 | 7/2008 | Mueller et al. | |
| 2008/0162321 A1 | 7/2008 | Breeden et al. | |
| 2008/0162322 A1 | 7/2008 | Breeden et al. | |
| 2008/0247629 A1 | 10/2008 | Gilder et al. | |

OTHER PUBLICATIONS

"Vision, Strategy & Approach to Image Quality & Archive Integrity, A Review of Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check 21?", VSOFT Corporation, available at http://www.vsoftcorp.com/check21.htm.

"Check21 Cash Letter: Clear Check Images Rather than Paper Checks", SYMITAR, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Holcomb, Notice 04-57, Aug. 27, 2004, Federal Reserve Bank of Dallas, 6 pages.

Microsoft Computer Dictionary, Fifth Edition, Microsoft Press, Copyright 2002, p. 258, 3 pages.

"CONIX Systems Launches Dupe Detective: New Product Eliminates Cost and Liability of Processing Items Multiple Times", Business Wire, May 18, 2006, 3 pages.

"Alogent Offering Sierra Solution for Image Cash Letter Deposits: Image Cash Letter and Back Office Conversion Capabilities Optimized for Large Merchants and Correspondent Banks", Business Wire, Oct. 10, 2005, p. 1, 2 pages.

"Taking Control of Payment Duplication: An In-Depth Look at a Serious Challenge Created by Check 21", Conix Systems, Inc., White Papers, Sep. 8, 2006, Retrieved Feb. 3, 2009, http://www.conix.com/news/default.asp, 9 pages.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008, 5 pages.

Labaze, U.S. Appl. No. 11/482,360, Office Action, Sep. 23, 2009, 8 pages.

Captovation Announces the Release of Check Capture 5.1; Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.com/solutions_7.htm> retrieved Apr. 26, 2011 (6 pages).

* cited by examiner

ELECTRONIC IMAGE CASH LETTER VALIDATION

RELATED PATENT APPLICATION

This patent application claims priority under 35 U.S.C. §119 to U.S. Provisional Patent Application No. 60/801,025, entitled "Electronic Check Processing Image Cash Letter Edit Filter and Testing Tool," filed May 17, 2006, the complete disclosure of which is hereby fully incorporated herein by reference.

FIELD OF THE INVENTION

The invention relates generally to electronic image cash letter ("ICL") validation and more particularly to validating ICL files using appropriate validation standards for each ICL file and, where appropriate, allowing successfully validated elements of an ICL file containing one or more unsuccessfully validated elements to be processed for payment and/or presentment.

BACKGROUND OF THE INVENTION

Effective Oct. 28, 2004, the Check Clearing for the 21st Century Act ("the Act") improved the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," can be created from an electronic check image and associated electronic information. Such a substitute check meeting specified requirements is the legal equivalent of an original paper check, and an RI is required to accept the substitute check for payment. This process enables banks to reduce the costs and inconveniences associated with physically handling and transporting original paper checks.

Under the Act, the substitute check must be essentially an exact copy of the original paper check to be the legal equivalent of the original paper check. In particular, the substitute check must include an exact copy of all of the Magnetic Ink Character Recognition ("MICR") data provided on the original paper check and all check endorsements.

The terms "substitute check" and "IRD" generally are used interchangeably herein to refer to any electronic or paper document that can be used for electronic payment processing purposes, whether or not the document is the legal equivalent of a paper check negotiable instrument. The terms "bank," "customer," "RI," and "processing entity" generally are used herein to refer to any party performing conventional or electronic check processing at any stage, including depositing and receiving institutions, their non-bank subsidiaries and affiliates, and any non-bank third party agents that provide processing services to banks.

Typically, each electronic check is received for processing in an electronic image cash letter file (hereinafter an "ICL file"), which includes one or more electronic image cash letters ("ICLs"). Each ICL includes one or more bundles of items to be processed. The term "item" is used herein to refer to a check or an IRD or information that represents a check or an IRD. For a particular item, the ICL can include one or more electronic images of the item, the complete MICR data provided on the item, and additional financial data related to the item, such as endorsement information (hereinafter, "addenda data").

The ICL can further include a series of records related to the items. For example, for each bundle of items in the ICL, the ICL can include a bundle summary control record comprising information about the bundle, such as a bundle identification number, the number of items in the bundle, the value of each of the items in the bundle, and the total value of all the items in the bundle. The ICL also can include an ICL control record comprising information about the origin and destination of the ICL, and a cash letter bundle summary control record comprising a summary of all the bundle summary control records in the ICL. For simplicity, each ICL, bundle, item, image, record, or other component of an ICL file is referred to herein as an "element" of the ICL file.

Upon receiving an ICL file for processing, a processing entity typically validates the format and contents of the ICL file to ensure compliance with pre-designated formatting and content standards. Conventionally, the same formatting and content standards are applied to every ICL file received by the processing entity, regardless of any differences in the ICL files. Oftentimes, certain of the applied standards are appropriate for only some of the ICL files and not other of the ICL files. Therefore, some ICL files traditionally have been improperly rejected during validation for failure to comply with inappropriate validation standards.

Validation typically occurs at the ICL file, ICL, bundle, item, image, and record levels. Traditionally, if the validation fails at any of these levels, then the entire ICL file is rejected and returned to the bank that previously submitted the ICL file for processing. That bank must determine the reason why the ICL file was rejected, edit the ICL file to overcome the rejection, and resubmit the ICL file for processing. Such processing involves many inefficiencies, most notably the delay involved in resubmitting and revalidating ICLs, bundles, items, images, and/or records that did not cause the original rejection of the ICL file.

Thus, a need exists in the art for a system and method for efficiently validating ICL files. In particular, a need exists in the art for a system and method for validating ICL files using appropriate validation standards for each ICL file. A further need exists in the art for a system and method for allowing successfully validated elements of an ICL file containing one or more unsuccessfully validated elements to be processed for payment and/or presentment, where appropriate.

SUMMARY OF THE INVENTION

The invention provides systems and methods for efficiently validating ICL files. Specifically, the invention provides systems and methods for validating ICL files using appropriate validation standards for each ICL file. Validation using appropriate validation standards for each ICL file can make validation results more meaningful and prevent improper validation rejections of the ICL files.

A processing entity can receive an ICL file for processing. For example, a bank (hereinafter, the "customer") can submit the ICL file to the processing entity for electronic check payment and/or presentment processing services. Alternatively, the customer can submit the ICL file to the processing entity simply for validation processing. For example, a customer can request the processing entity to validate a series of ICL files to ensure successful validation of the same or similar ICL files during future payment and/or presentment processing.

A validation application of the processing entity can include a rule selection module configured to select appropriate validation rules to apply to the received ICL file. In certain aspects of the invention, the rule selection module can select the rules based on a file type of the ICL file, data content of the ICL file, and/or an identify of a bank associated with the ICL file. For example, a different set of validation rules can apply to each bank to which the processing entity transmits a processed ICL file.

Similarly, a different set of validation rules can apply to each customer from which the processing entity receives an ICL file for processing. For example, different validation rules can apply to different ICL files of customers subscribing to different services of the processing entity. By way of example only, a validation rule can reject a return item of a customer who has not subscribed to a return transaction processing service of the processing entity.

The rule selection module can read the file type, data content, and/or bank identify from the ICL file. For example, a file header of the ICL file can include a bank name and/or routing number identifying the customer from which the processing entity received the ICL file. Similarly, the file header of the ICL file and/or a record of an ICL in the ICL file can include data content identifying whether an item within the ICL is associated with a forward transaction or a return transaction.

Each of the rules can correspond to an industry standard, a standard of the processing entity, and/or a standard of the bank(s) associated with the ICL file. For example, certain of the rules can correspond to the American National Standards Institute Specifications for Electronic Exchange of Check and Image Data ("ANSI X9.37/X9.100") or other appropriate industry standards, as may change from time to time.

A rule application module of the validation application can validate the ICL file by determining whether elements of the ICL file comply with the selected validation rules. For example, the rule application module can determine whether a file header of the ICL file, a structure of the ICL file, a cover page control record of each ICL in the ICL file, a bundle summary control record of each bundle of items in each ICL, an image in each item, a financial data file in each item, addenda data in each item, and/or a cash letter bundle summary control record in each ICL comply with the selected validation rules. For simplicity, each instance of non-compliance of any element in the ICL file with a validation rule is referred to herein as a "validation error."

In certain aspects of the invention, the rule application module can generate a report with results from the validation. For example, the report can include information identifying whether each element of the ICL file complies with the selected validation rules. The rule application module can transmit the report to the customer. For example, the rule application module can print a hard copy of the report for mailing to the customer or can electronically transmit a copy of the report to the customer via email, a secure website, or other suitable electronic means. The information in the report can help the customer to revise/correct validation errors in the ICL file.

The rule application module can transmit successfully validated elements of the ICL file to a check processing module of the processing entity for further processing. In certain aspects of the invention, the rule application module can determine whether to transmit the elements for processing based on certain of the validation rules. For example, a validation rule might disallow processing of an ICL where a threshold number of validation errors exist in the ICL or the elements contained therein. Similarly, a validation rule might disallow processing of an item where an image in the item has an insufficiently high image quality rating.

These and other aspects, objects, features, and advantages of the invention will become apparent to a person skilled in the art upon consideration of the following detailed description of illustrated exemplary embodiments, which include the best mode of carrying out the invention as presently perceived.

DETAILED DESCRIPTION OF EXEMPLARY EMBODIMENTS

The invention is directed to validating ICL files using appropriate validation standards for each ICL file and, where appropriate, allowing successfully validated elements of an ICL file containing one or more unsuccessfully validated elements to be processed for payment and/or presentment. Using appropriate validation standards for each ICL file can allow the validation results to be more meaningful and prevent improper rejections of ICL files. Allowing successfully validated elements of an ICL file containing one or more unsuccessfully validated elements to be processed for payment and/or presentment can make the validation process more efficient by preventing unnecessary re-processing of compliant ICL file elements.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
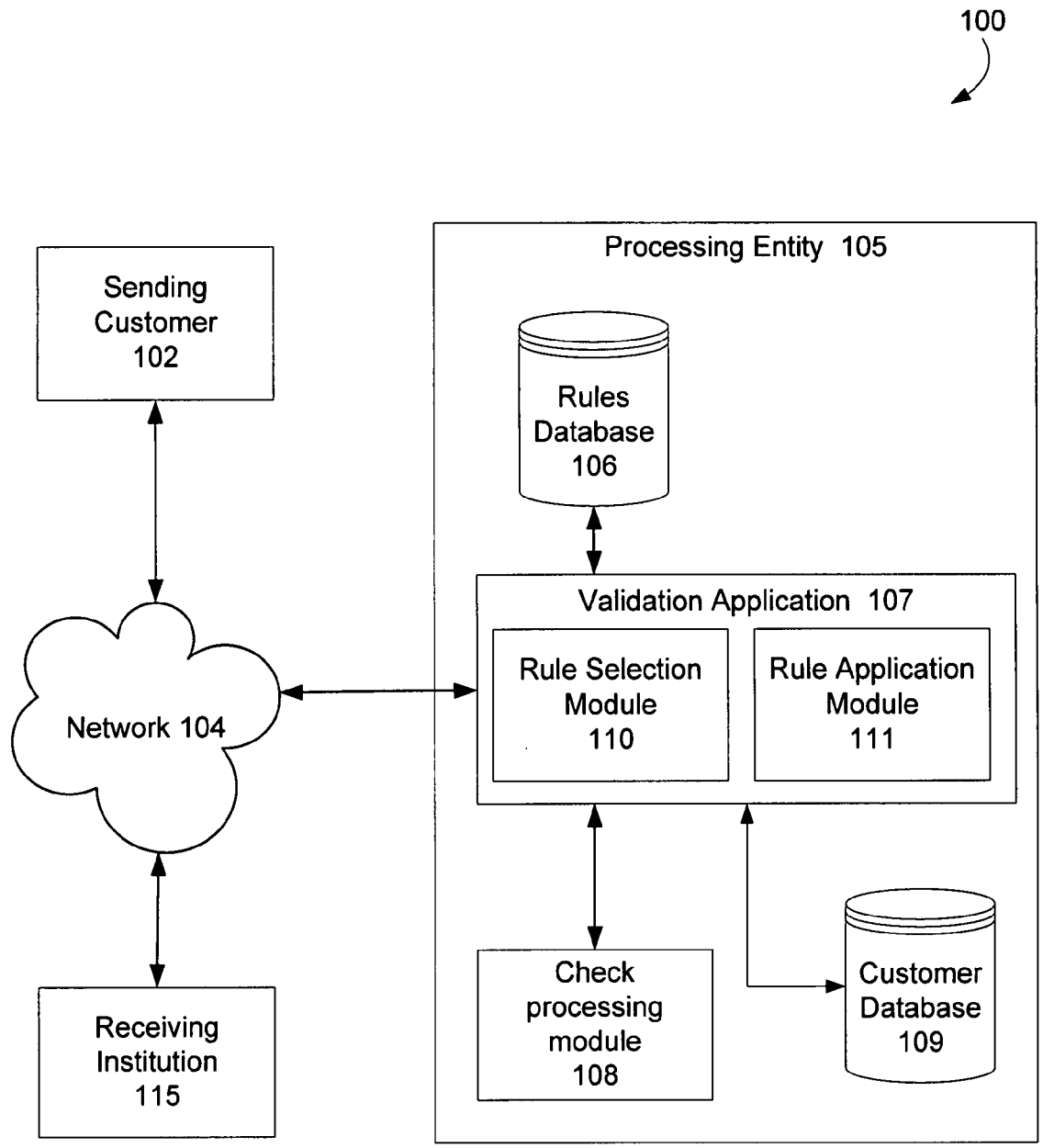
FIG. 1 is a block diagram depicting a system for validating an ICL file, in accordance with certain exemplary embodiments of the invention.

FIG. 1 is a block diagram depicting a system 100 for validating an ICL file, in accordance with certain exemplary embodiments of the invention. The system 100 is described below with reference to the methods illustrated in FIGS. 2-5.

Figure 2:
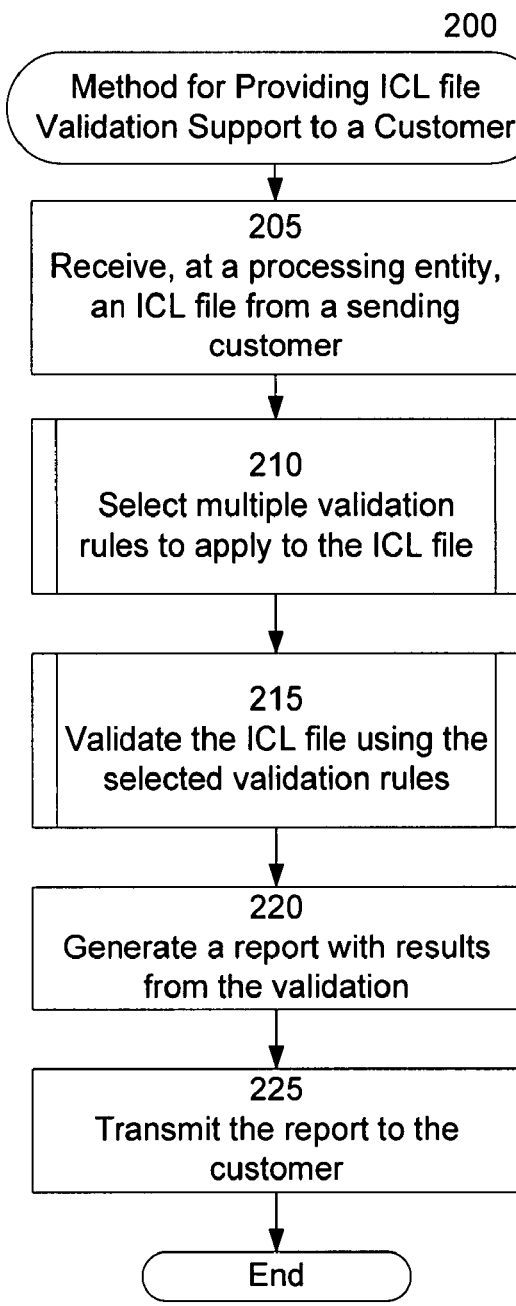
FIG. 2 is a flow chart depicting a method for providing ICL file validation support to a customer, according to certain exemplary embodiments of the invention.

FIG. 2 is a flow chart depicting a method 200 for providing ICL file validation support to a customer 102 (FIG. 1), according to certain exemplary embodiments of the invention. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described below with reference to FIGS. 1 and 2.

In step 205, a processing entity 105 receives an ICL file from a sending customer 102. For example, the customer 102 can submit the ICL file to the processing entity 105 for electronic check payment and/or presentment processing services. Alternatively, the customer 102 can submit the ICL file to the processing entity 105 simply for validation processing. For example, the customer 102 can request the processing entity 105 to validate a series of ICL files to ensure successful validation of the same or similar ICL files during future payment and/or presentment processing.

The ICL file is an electronic file that includes at least one ICL. For example, each ICL can be an electronic file that complies with the ANSI X9.37/X9.100 standard, or other appropriate industry standards, as may change from time to time. Each ICL includes one or more bundles of items (checks and/or IRDs) to be processed. For a particular item, the ICL can include one or more electronic images of the item, all of the complete MICR data provided on the item, and addenda data of the item.

The ICL also can include a series of records related to the items. For example, for each bundle of items in the ICL, the ICL can include a bundle summary control record including information about the bundle, such as a bundle identification number, the number of items in the bundle, the value of each of the items in the bundle, and the total value of all the items in the bundle. The ICL also can include an ICL control record containing information about the origin and destination of the ICL, and a cash letter bundle summary control record containing a summary of all the bundle summary control records in the ICL.

In certain embodiments of the invention, the ICL file also can include a file header including information identifying the customer 102, such as a name of the customer 102 and/or a bank routing number of the customer 102. The file header also can include information regarding a creation date of the ICL file and information regarding whether each item in the ICL file is associated with a forward transaction or a return transaction.

For example, the customer 102 can submit the ICL file to the processing entity 105 via the network 104. The network 104 can include any wired or wireless telecommunication means by which computerized devices can exchange data, including for example, a local area network (LAN), a wide area network (WAN), an intranet, an Internet, or any combination thereof.

In step 210, a validation application 107 of the processing entity 105 selects multiple validation rules to apply to the ICL file received in step 205. For example, the validation rules can be stored in a rules database 106 of the processing entity 105. A rule selection module 110 of the validation application 107 can select the validation rules based on certain features of the ICL file and/or the elements contained therein. For example, the rule selection module 110 can select the validation rules based on a file type of the ICL file, data content of the ICL file, and/or an identity of a bank associated with the ICL file. Different validation rules can apply to each ICL file received by the processing entity 105. Step 210 is described in more detail below with reference to FIG. 3.

In step 215, a rule application module 111 of the validation application 107 validates the ICL file using the validation rules selected in step 210. Specifically, the rule application module 111 compares the structure and/or contents of the ICL file and/or the elements contained within the ICL file with the selected validation rules to determine whether the ICL file (and/or the ICL file elements) complies with the selected validation rules. For example, the rule application module 111 can determine whether a file header of the ICL file, a structure of the ICL file, a cover page control record of each ICL in the ICL file, a bundle summary control record of each bundle of items in each ICL, an image in each item, a financial data file in each item, addenda data in each item, and/or a cash letter bundle summary control record in each ICL comply with the selected validation rules. Step 215 is described in more detail below with reference to FIG. 4.

In step 220, the rule application module 111 generates a report with results of the validation. For example, the report can include information identifying whether each element of the ICL file complies with the selected validation rules. The report also can include information regarding a cause for each validation error identified during the validation. For example, the report can specifically identify the reason why each unsuccessfully validated element failed validation, including a name of the element and/or information identifying the portion of the element that caused the validation error.

Figure 3:
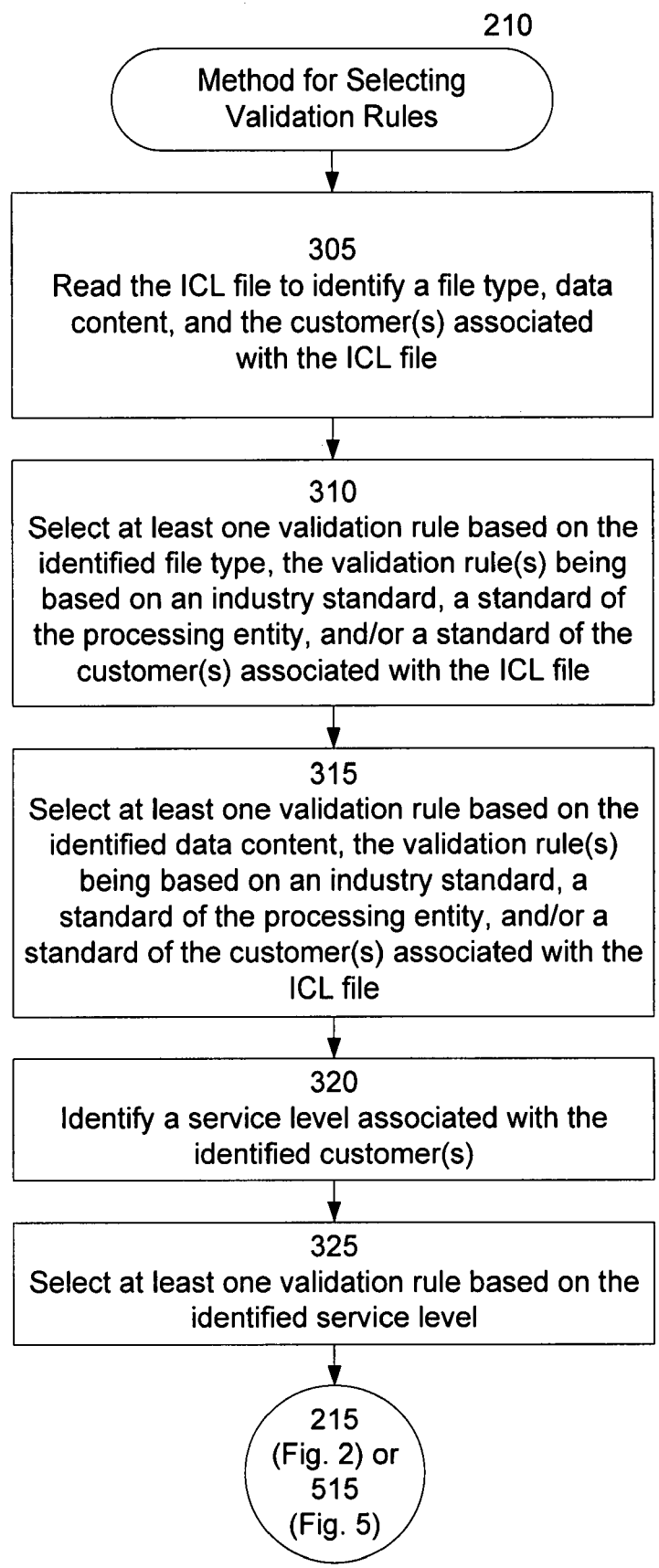
FIG. 3 is a flow chart depicting a method for selecting validation rules, according to certain exemplary embodiments of the invention.

In step 225, the processing entity 105 transmits the generated report to the customer 102. For example, the rule application module 111 can print a hard copy of the report for mailing to the customer or electronically transmit a copy of the report to the customer via email, a secure web site, FIG. 3 is a flow chart depicting a method 210 for selecting validation rules, according to certain exemplary embodiments of the invention, as referred to in step 210 of FIG. 2. The exemplary method 210 is illustrative and, in alternative embodiments of the invention, certain steps can be performed in a different order, in parallel with one another, or omitted entirely, and/or certain additional steps can be performed without departing from the scope and spirit of the invention. The method 210 is described below with reference to FIGS. 1 and 3.

In step 305, the rule selection module 110 reads the ICL file to identify a file type, data content, and the customer(s) associated with the ICL file. The term "file type" is used herein to refer to a file format associated with the ICL file and/or an element contained therein. For example, a file type of an ICL within the ICL file can be an ICL file format that complies with the ANSI X9.37/X9.100 standard. Similarly, a file type of an image within an ICL of the ICL file can be a .tiff file format, a .jpg file format, or other suitable image file format.

The term "data content" is used herein to refer to any information contained within the ICL file and/or an element contained therein. The terms "data" and "information" are used interchangeably herein to refer to text, images, audio, signatures, and/or any other form of information that can exist in a computer-based environment. For example, a file header of the ICL file and/or a record of an ICL in the ICL file can include data content identifying whether an item within the ICL is associated with a forward transaction or a return transaction.

The customer(s) associated with the ICL file can include the customer 102 and/or an RI 115 to which the processing entity 105 or the customer 102 will transmit the ICL file and/or certain elements contained therein after processing. For example, the rule selection module 110 can read a file header of the ICL file to identify a name and/or routing number of each customer associated with the ICL file.

In step 310, the rule selection module 110 selects at least one validation rule based on the file type identified in step 305. The validation rule is based on an industry standard, a standard of the processing entity 105, and/or a standard of the customer(s) associated with the ICL file. For example, where the file type identified in step 305 is a file format of an ICL in the ICL file, the validation rule can require a record of the ICL to comply with one or more requirements of the ANSI X9.37/X9.100 standard. In certain embodiments of the invention, each customer can have its own set of validation standards. For example, information identifying such standards can be stored in a customer database 109 of the processing entity.

In step 315, the rule selection module 110 selects at least one validation rule based on the data content identified in step 305. Like the validation rule(s) selected in step 310, the validation rule(s) selected in step 315 is based on an industry standard, a standard of the processing entity 105, and/or a standard of the customer(s) associated with the ICL file. For example, if the rule selection module 110 read data content in step 305 that identified an item within an ICL of the ICL file as being associated within a forward transaction, the rule selection module 110 can select a validation rule directed to forward transactions (as opposed to return transactions) in step 315.

In step 320, the rule selection module 110 identifies a service level associated with the customer(s) identified in step 105. The term "service level" is used herein to a set of one or more processing services that the processing entity 105 can perform for a bank. For example, certain customers can subscribe to validation, check payment, and check presentment services, whereas certain other customers can subscribe only to a subset of these services for a subset of transaction types. By way of example only, certain customers might subscribe to services for forward transactions and not to services for return transactions. A service level for a particular customer also can include a list of one or more other banks to which the customer can address, or from which the customer can receive, ICL files or certain elements contained therein. For example, the rule selection module 110 can identify the service level associated with the customer(s) by reading information in the customer database 109.

In step 325, the rule selection module 110 selects at least one validation rule based on the identified service level. For example, where a customer does not subscribe to services for return transactions, the validation rule might reject all items related to return transactions.

Figure 4:
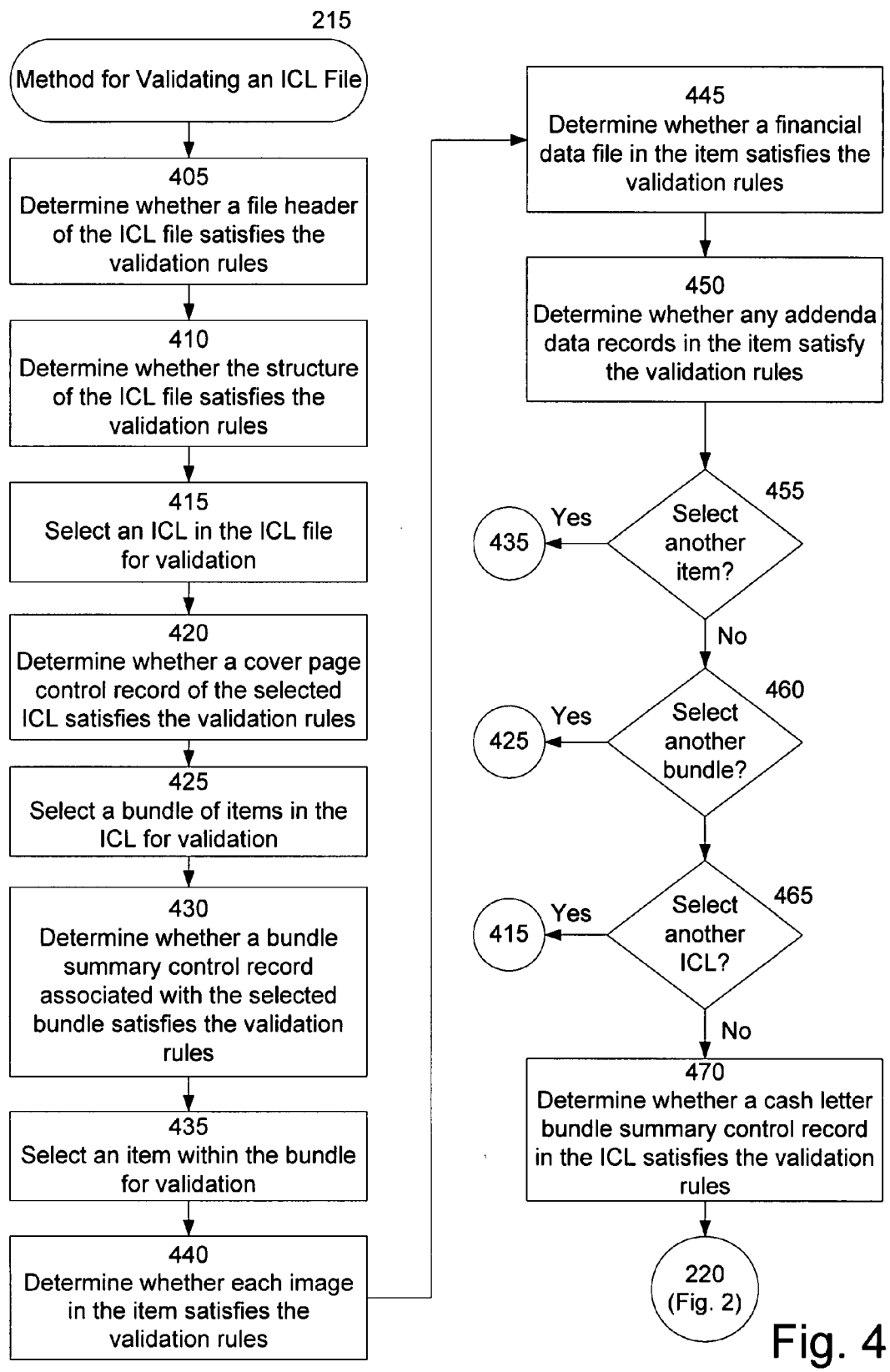
FIG. 4 is a flow chart depicting a method for validating an ICL file, in accordance with certain exemplary embodiments of the invention.

FIG. 4 is a flow chart depicting a method 215 for validating an ICL file, according to certain exemplary embodiments of the invention, as referred to in step 215 of FIG. 2. The exemplary method 215 is illustrative and, in alternative embodiments of the invention, certain steps can be performed in a different order, in parallel with one another, or omitted entirely, and/or certain additional steps can be performed without departing from the scope and spirit of the invention. The method 215 is described below with reference to FIGS. 1 and 4.

In the method 215, the rule application module 111 compares the structure and/or contents of the ICL file and/or the elements contained within the ICL file with the validation rules selected in step 210 of FIG. 2 to determine whether the ICL file (and/or the ICL file elements) complies with the selected validation rules.

Specifically, in step 405, the rule application module 111 determines whether a file header of the ICL file complies with the selected validation rules. For example, the rule application module 111 can verify whether certain data fields or records within the file header are appropriately structured and/or contain appropriate information. By way of example only, the rule application module 111 can detect a validation error within the file header if a data field or record within the file header is empty, has an inappropriate structure, or includes a character or string that is not in the proper format.

In step 410, the rule application module 111 determines whether the structure of the ICL file satisfies the validation rules. For example, the rule application module 111 can determine whether each ICL or other element within the ICL file is stored in an appropriate location within the ICL file and/or whether each ICL or other element is of an appropriate size.

In step 415, the rule application module 111 selects an ICL in the ICL file for validation. In step 420, the rule application module 111 determines whether a cover page control record of the selected ICL satisfies the validation rules. For example, the rule application module 111 can verify whether certain data fields or records within the cover page control record are appropriately structured and/or contain appropriate information. By way of example only, the rule application module 111 can detect a validation error within the cover page control record if a data field or record within the cover page control record is empty, has an inappropriate structure, or includes a character or string that is not in the proper format.

In step 425, the rule application module 111 selects a bundle of items in the ICL for validation. In step 430, the rule application module 111 determines whether a bundle summary control record associated with the selected bundle satisfies the validation rules. For example, the rule application module 111 can verify whether certain data fields or records within the bundle summary control record are appropriately structured and/or contain appropriate information. By way of example only, the rule application module 111 can detect a validation error within the bundle summary control record if a data field or record within the bundle summary control record is empty, has an inappropriate structure, or includes a character or string that is not in the proper format.

In step 435, the rule application module 111 selects an item within the bundle for validation. In step 440, the rule application module 111 determines whether each image within the item satisfies the validation rules. For example, the rule application module 111 can determine whether an image within the item is of sufficient quality to use in creating a substitute check. Certain exemplary methods for analyzing the quality of an electronic image are described in co-pending U.S. patent application Ser. No. 11/079,120, entitled "Assessing Electronic Image Quality," the complete disclosure of which is hereby fully incorporated herein by reference.

In step 445, the rule application module 111 determines whether a financial data file in the item satisfies the validation rules. For example, the rule application module 111 can verify whether certain data fields or records within the financial data file are appropriately structured and/or contain appropriate information. By way of example only, the rule application module 111 can detect a validation error within the financial data file if a data field or record within the financial data file is empty, has an inappropriate structure, or includes a character or string that is not in the proper format. Certain exemplary methods for analyzing the contents of a financial data file are described in co-pending U.S. patent application Ser. No. 11/362,344, entitled "Cash Letter Print Streams With Audit Data" and U.S. patent application Ser. No. 11/362,343, entitled "Expanded Mass Data Sets for Electronic Check Processing," the complete disclosures of which are hereby fully incorporated herein by reference.

In step 450, the rule application module 111 determines whether any addenda data records in the item satisfy the validation rules. For example, the rule application module 111 can verify whether certain data fields within an addenda data record are appropriately structured and/or contain appropriate information. By way of example only, the rule application module 111 can detect a validation error within an addenda data record if a data field is empty or if it includes a character or string that is not in the proper format.

In steps 455-465, the rule application module 111 repeats the validation steps 415-450 for the remaining ICLs, bundles, and items in the ICL file until all of the elements of the ICL file have been validated. Specifically, in step 455, the rule application module 111 determines whether to select another item for validation. If so, the method 215 branches back to step 435 to select and validate the other item. If the rule application module 111 determines in step 455 not to select another item for validation, then the method 215 branches to step 460.

In step 460, the rule application module 111 determines whether to select another bundle of items for validation. If so, the method 215 branches back to step 425 to select and validate the other item. If the rule application module 111 determines in step 460 not to select another bundle for validation, then the method 215 branches to step 465.

In step 465, the rule application module 111 determines whether to select another ICL for validation. If so, the method 215 branches back to step 415 to select and validate the other ICL. If the rule application module 111 determines in step 465 not to select another ICL for validation, then the method 215 branches to step 470.

In step 470, the rule application module 111 determines whether a cash letter bundle summary control record in the ICL satisfies the validation rules. For example, the rule application module 111 can verify whether certain data fields or records within the cash letter bundle summary control record are appropriately structured and/or contain appropriate information. By way of example only, the rule application module 111 can detect a validation error within the cash letter bundle summary control record if a data field or record within the cash letter bundle summary control record is empty, has an inappropriate structure, or includes a character or string that is not in the proper format.

Figure 5:
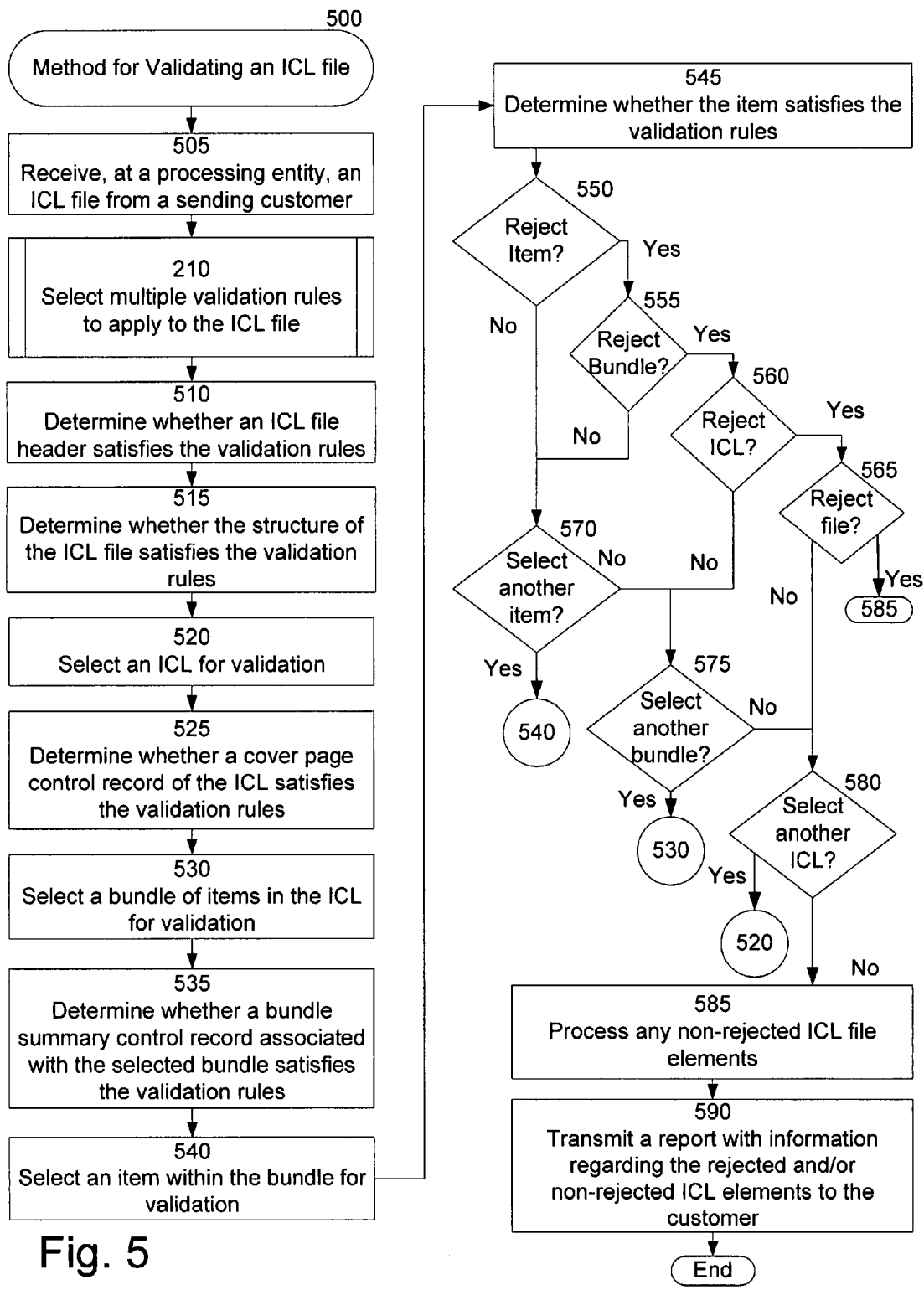
FIG. 5 is a flow chart depicting a method for validating an ICL file, in accordance with certain alternative exemplary embodiments of the invention.

FIG. 5 is a flow chart depicting a method 500 for validating an ICL file, in accordance with certain alternative exemplary embodiments of the invention. The exemplary method 500 is illustrative and, in alternative embodiments of the invention, certain steps can be performed in a different order, in parallel with one another, or omitted entirely, and/or certain additional steps can be performed without departing from the scope and spirit of the invention. The method 500 is described below with reference to FIGS. 1 and 5.

In step 505, the processing entity 105 receives an ICL file for electronic check payment and/or presentment processing services from a sending customer 102. For example, the customer 102 can submit the ICL file to the processing entity 105 via the network 104.

In step 210, the validation application 107 of the processing entity 105 selects multiple validation rules to apply to the ICL file received in step 505. For example, the validation rules can be stored in the rules database 106 of the processing entity 105. The rule selection module 110 of the validation application 107 can select the validation rules based on certain features of the ICL file and/or the elements contained therein. For example, the rule selection module 110 can select the validation rules based on a file type of the ICL file, data content of the ICL file, and/or an identity of a bank associated with the ICL file. Different validation rules can apply to each ICL file received by the processing entity 105. Step 210 is described in more detail above with reference to FIG. 3.

Similar to the method 215 of FIG. 4, described above, in steps 510-545, the rule application module 111 of the validation application 107 compares the structure and/or contents of the ICL file and/or the elements contained within the ICL file with the validation rules selected in step 210 to determine whether the ICL file (and/or the ICL file elements) complies with the selected validation rules.

Specifically, in step 510, the rule application module 111 determines whether a file header of the ICL file complies with the selected validation rules. For example, the rule application module 111 can verify whether certain data fields or records within the file header are appropriately structured and/or contain appropriate information. By way of example only, the rule application module 111 can detect a validation error within the file header if a data field or record within the file header is empty, has an inappropriate structure, or includes a character or string that is not in the proper format.

In step 515, the rule application module 111 determines whether the structure of the ICL file satisfies the validation rules. For example, the rule application module 111 can determine whether each ICL or other element within the ICL file is stored in an appropriate location within the ICL file and/or whether each ICL or other element is of an appropriate size.

In step 520, the rule application module 111 selects an ICL in the ICL file for validation. In step 525, the rule application module 111 determines whether a cover page control record of the selected ICL satisfies the validation rules. For example, the rule application module 111 can verify whether certain data fields or records within the cover page control record are appropriately structured and/or contain appropriate information. By way of example only, the rule application module 111 can detect a validation error within the cover page control record if a data field or record within the cover page control record is empty, has an inappropriate structure, or includes a character or string that is not in the proper format.

In step 530, the rule application module 111 selects a bundle of items in the ICL for validation. In step 535, the rule application module 111 determines whether a bundle summary control record associated with the selected bundle satisfies the validation rules. For example, the rule application module 111 can verify whether certain data fields or records within the bundle summary control record are appropriately structured and/or contain appropriate information. By way of example only, the rule application module 111 can detect a validation error within the bundle summary control record if a data field or record within the bundle summary control record is empty, has an inappropriate structure, or includes a character or string that is not in the proper format.

In step 540, the rule application module 111 selects an item within the bundle for validation. In step 545, the rule application module 111 determines whether the item satisfies the validation rules. For example, the rule application module 111 can determine whether an image within the item is of sufficient quality to use in creating a substitute check, whether certain data fields or records within a financial data file of the item are appropriately structured and/or contain appropriate information, and/or whether any addenda data records in the item are appropriately structured and/or contain appropriate information.

In steps 550-565, the rule application module 111 determines whether the item, bundle, ICL, and/or ICL file analyzed in steps 510-545 should be rejected from further processing. For example, certain validation errors at the item level might be of sufficient severity to disallow processing of the entire ICL file. By way of example only, a validation error caused by an item image in the ICL file might disqualify the entire ICL file from further processing. Similarly, an aggregate number of errors at the item, bundle, ICL, and/or ICL file level might disqualify an entire bundle, an entire ICL, and/or the ICL file Specifically, in step 550, the rule application module 111 determines whether to reject the item evaluated in step 545 from further processing. For example, the rule application module 111 can determine to reject the item if one or more validation errors are identified in step 545. Similarly, the rule application module 111 can determine to reject the item if one or more validation errors are identified in connection with the bundle containing the item, the ICL containing the item, or the ICL file itself. If the rule application module 111 determines in step 550 not to reject the item, then the method branches to step 570.

In step 570, the rule application module 111 determines whether to select another item for validation. If so, then the method 500 branches back to step 540 to select and validate the other item. If the rule application module 111 determines in step 570 not to select another item for validation, then the method 500 branches to step 575.

In step 575, the rule application module 111 determines whether to select another bundle of items for validation. If so, then the method 500 branches back to step 530 to select and validate the other bundle. If the rule application module 111 determines in step 575 not to select another bundle for validation, then the method 500 branches to step 580.

In step 580, the rule application module 111 determines whether to select another ICL for validation. If so, then the method 500 branches back to step 520 to select and validate the other ICL. If the rule application module 111 determines in step 580 not to select another bundle for validation, then the method 500 branches to step 585.

If the rule application module 111 determines in step 550 to reject the item, then the method 500 branches to step 555. In step 555, the rule application module 111 determines whether to reject the bundle containing the rejected item. For example, the rule application module 111 can determine to reject the bundle if a validation error associated with the rejected item is sufficiently severe to disqualify the entire bundle from further processing. Similarly, the rule application module 111 can determine to reject the bundle if one or more validation errors are identified in steps 510, 515, 525, 535, and/or 545. If the rule application module 111 determines in step 555 not to reject the bundle, then the method branches to step 570, described above. If the rule application module 111 determines in step 555 to reject the item, then the method branches to step 560.

In step 560, the rule application module 111 determines whether to reject the ICL containing the rejected bundle. For example, the rule application module 111 can determine to reject the ICL if a validation error associated with the rejected bundle is sufficiently severe to disqualify the entire ICL from further processing. Similarly, the rule application module 111 can determine to reject the ICL if one or more validation errors are identified in steps 510, 515, 525, 535, and/or 545. If the rule application module 111 determines in step 560 not to reject the ICL, then the method branches to step 575, described above. If the rule application module 111 determines in step 560 to reject the item, then the method branches to step 565.

In step 565, the rule application module 111 determines whether to reject the ICL file containing the rejected ICL. For example, the rule application module 111 can determine to reject the ICL file if a validation error associated with the rejected ICL is sufficiently severe to disqualify the entire ICL file from further processing. Similarly, the rule application module 111 can determine to reject the ICL file if one or more validation errors are identified in steps 510, 515, 525, 535, and/or 545. If the rule application module 111 determines in step 565 not to reject the ICL, then the method branches to step 580, described above. If the rule application module 111 determines in step 565 to reject the item, then the method branches to step 585.

In step 585, the rule application module 111 transmits any non-rejected ICL file elements to a check processing module 108 of the processing entity 105 for processing. For example, the check processing module 108 can process certain successfully validated items for payment and/or presentment. Certain exemplary methods for performing such processing are described in co-pending U.S. patent application Ser. No. 11/362,344, entitled "Cash Letter Print Streams With Audit Data" and U.S. patent application Ser. No. 11/362,343, entitled "Expanded Mass Data Sets for Electronic Check Processing," the complete disclosures of which are hereby fully incorporated herein by reference.

In step 580, the rule application module 111 transmits a report regarding the rejected and/or non-rejected ICL elements to the sending customer 102. For example, the report can include information identifying whether each element of the ICL file has been successfully validated and/or whether each ICL file element has been processed by the check processing module 108. The report also can include information regarding a cause for each validation error identified in the report. For example, the report can specifically identify the reason why each unsuccessfully validated element failed validation, including a name of the element and/or information identifying the portion of the element that caused the validation error.

In certain embodiments, the rule application module 111 can return each unsuccessfully validated element and/or each element not processed by the check processing module 108 to the sending customer 102 for reference in reviewing the report and/or for re-submission. The rule application module 111 also can store one or more records of the validation results in one or more of the ICL file elements. For example, the rule application module 111 can store an image quality analysis score for an item image in a data field number 12 of a financial data file of the item.

For example, the rule application module 111 can print a hard copy of the report for mailing to the customer or electronically transmit a copy of the report to the customer via email, a secure web site, or other suitable electronic means.

In certain alternative embodiments, the rule application module 111 can transmit the report to the sending customer 102 prior to submitting the successfully validated elements to the check processing module 108 for processing.

The invention can be used with computer hardware and software that performs the methods and processing functions described above. As will be appreciated by a person skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person skilled in the art without departing from the spirit and scope of the present invention defined in the following claims, the scope of which is to be accorded the broadest interpretation so as to encompass such modifications and equivalent structures.

We claim:

1. A computer-implemented method for validating electronic image cash letter ("ICL") files, comprising the steps of:
    receiving a first ICL file and a second ICL file, each ICL file comprising at least one ICL, each ICL comprising at least an electronic image of a check;
    selecting, by a computer, from a plurality of validation rules, a first set of validation rules to apply to the first ICL file based on at least one of a file type of the first ICL file and an identity of a bank associated with the first ICL file;
    selecting, by the computer, from the plurality of validation rules, a second set of validation rules to apply to the second ICL file based on at least one of a file type of the second ICL file and an identity of a bank associated with the second ICL file, the second set of validation rules being different than the first set of validation rules;
    validating, by the computer, whether the first ICL file is acceptable for electronic processing for at least one of payment and presentment for payment based on the first selected set of validation rules;
    electronically processing the first ICL file for at least one of payment and presentment for payment only in response to determining that the first ICL file has been successfully validated;
    validating, by the computer, whether the second ICL file is acceptable for electronic processing for at least one of payment and presentment for payment based on the second selected set of validation rules; and
    electronically processing the second ICL file for at least one of payment and presentment for payment only in response to determining that the second ICL file has been successfully validated.

2. The method of claim 1, further comprising the steps of:
    generating a report comprising at least one result of the validating steps; and
    transmitting the report to at least one of the banks associated with the first ICL file or the second ICL file.

3. The method of claim 2, wherein
the step of receiving the first ICL file comprises receiving the first ICL file from a first customer, and the bank associated with the first ICL file is the first customer.

4. The method of claim 1, further comprising the step of rejecting at least a portion of the first ICL file in response to determining that the first ICL file has not been successfully validated as acceptable for electronic processing for at least one of payment and presentment for payment.

5. The method of claim 4, wherein the step of rejecting at least a portion of the first ICL file comprises the steps of:
    identifying a total number of validation errors when validating whether the first ICL file is acceptable for electronic processing;
    comparing the total number of validation errors to a predefined threshold value; and
    rejecting at least one element of the first ICL file if the total number of validation errors exceeds the predefined threshold value, each element of the first ICL file comprising one of an ICL, an item bundle, and an electronic check item.

6. The method of claim 1, wherein
the first ICL file comprises a plurality of ICLs, and
the step of electronically processing the first ICL file for at least one of payment and presentment for payment comprises the steps of:
    determining that certain ICLs in the first ICL file have been successfully validated and that other ICLs in the first ICL file have not been successfully validated; and
    processing only the ICLs determined to have been successfully validated for at least one of payment and presentment for payment.

7. The method of claim 1, wherein
the step of receiving the first ICL file comprises receiving the first ICL file from a customer, and
the step of selecting a first set of validation rules comprises the steps of:
    identifying a service level associated with the customer; and
    selecting at least one validation rule based on the identified service level.

8. The method of claim 1, wherein
the step of selecting the first set of validation rules comprises the steps of:
    identifying a file type of the first ICL file; and
    selecting at least one validation rule based on the identified file type.

9. The method of claim 1, wherein
the step of selecting the first set of validation rules further comprises the steps of:
    reading data content of the first ICL file; and
    selecting at least one validation rule based on the data content.

10. The method of claim 9, wherein the data content comprises information regarding whether an item in the first ICL file is associated with one of a forward transaction and a return transaction.

11. The method of claim 1, wherein the step of selecting the first set of validation rules further comprises the steps of:
    selecting at least one validation rule based on an industry standard;
    selecting at least one validation rule based on a standard of an entity receiving the first ICL file in the receiving step; and
    selecting at least one validation rule based on a standard of the bank associated with the first ICL file, the bank comprising an entity other than the entity receiving the first ICL file in the receiving step.

12. The method of claim 11, wherein
the step of receiving the first ICL file comprises receiving the first ICL file from a customer, and
the bank associated with the first ICL file is the customer.

13. The method of claim 1, further comprising the step of:
    determining whether an addenda data record of at least one of the first ICL file and the second ICL file includes a character or string of improper format.

14. The method of claim 1, wherein
the first ICL file comprises at least one ICL, each ICL comprises at least one bundle of items, each bundle of items comprises at least one check item, and each check item comprises at least one electronic image of a check, and
the step of validating whether the first ICL file is acceptable for electronic processing comprises
    validating whether a first ICL of the ICL file is acceptable for electronic processing based on a first rule of the first set of validation rules validating whether a first bundle of first ICL of the ICL file is acceptable for electronic processing based on a second rule of the first set of validation rules, and validating whether each check item of the first bundle of the first ICL of the ICL file is acceptable for electronic processing based on a third rule of the first set of validation rules.

15. The method of claim 14, further comprising the step of rejecting, based on the step of validating whether the first ICL file is acceptable for electronic processing, one of an entire ICL of the first ICL and an entire bundle of items of the first ICL file.

16. A computer-implemented method for validating an electronic image cash letter ("ICL"), comprising the steps of:
receiving the ICL, the ICL comprising a bundle of check items, each check item comprising an electronic image of a check;
selecting, by a computer, at least one validation rule to apply to the ICL based on at least one of a file type of the ICL and an identity of a bank associated with the ICL;
determining by the computer, that certain check items of the ICL are successfully validated as acceptable for electronic processing for at least one of payment and presentment for payment based on the at least one validation rule;
determining that certain other check items of the ICL are not successfully validated as acceptable for electronic processing for at least one of payment and presentment for payment based on the at least one validation rule;
electronically processing the certain check items determined to be successfully validated; and
rejecting the certain other check items determined not to be successfully validated.

17. The method of claim 16, wherein the ICL comprises two bundles of check items, and the method further comprises the steps of:
determining that one of the bundles is successfully validated and that another one of the bundles is not successfully validated based on the at least one validation rule;
electronically processing at least one of the items of the one of the bundles determined to be successfully validated; and
rejecting each item of the another one of the bundles determined not to be successfully validated.

18. The method of claim 16, wherein the step of receiving the ICL comprises the step of receiving an ICL file comprising the ICL.

19. The method of claim 16, wherein the step of receiving the ICL comprises the step of receiving an ICL file comprising multiple ICLs, and the method further comprises the steps of:
determining that at least one of the ICLs is successfully validated and that at least one other of the ICLs is not successfully validated based on the at least one validation rule;
electronically processing at least one item of each ICL determined to be successfully validated; and
rejecting each item of each ICL determined not to be successfully validated.

20. The method of claim 19, wherein
each of the ICLs comprises multiple bundles of items, and wherein the step of electronically processing at least one item of each ICL determined to be successfully validated comprises electronically processing at least one of the bundles of items of each ICL determined to be successfully validated.

21. The method of claim 16, wherein the step of selecting at least one validation rule comprises selecting, from a plurality of validation rules, a set of validation rules based on a file type of the ICL, data content of the ICL, and an identity of a bank associated with the ICL.

22. A computer-implemented method for validating an electronic image cash letter ("ICL"), comprising the steps of:
receiving the ICL, the ICL comprising a plurality of bundles of items, each item comprising an electronic image of a check;
selecting, by a computer, at least one validation rule to apply to the ICL based on at least one of a file type of the ICL and an identity of a bank associated with the ICL;
validating, by the computer, a bundle of the ICL as acceptable for electronic processing for at least one of payment and presentment for payment based on the at least one validation rule;
invalidating, by the computer, another bundle of the ICL for electronic processing for at least one of payment and presentment for payment based on the at least one validation rule;
electronically processing at least one item of the validated bundle for at least one of payment and presentment for payment; and
rejecting the another bundle for electronically processing for payment or presentment for payment.

23. The method of claim 22, wherein the step of rejecting the another bundle comprises rejecting each item of the another bundle.

24. The method of claim 22, further comprising the steps of:
validating an item of the validated bundle as acceptable for electronic processing for at least one of payment and presentment for payment based on the at least one validation rule; and
invalidating another item of the validated bundle for electronic processing for at least one of payment and presentment for payment based on the at least one validation rule, wherein
the step of electronically processing at least one item of the validated bundle further comprises electronically processing the validated item and rejecting the another item.

25. The method of claim 22, wherein the step of selecting at least one validation rule comprises selecting, from a plurality of validation rules, a set of validation rules based on a file type of the ICL, data content of the ICL, and an identity of a bank associated with the ICL.

26. A computer-implemented method for validating an electronic image cash letter ("ICL") file, comprising the steps of:
receiving the ICL file, the ICL file comprising a plurality of ICLs, each of the ICLs comprising a plurality of bundles of items, each item comprising an electronic image of a check;
selecting, by a computer, at least one validation rule to apply to the ICL file based on at least one of a file type of the ICL file and an identity of a bank associated with the ICL file;
validating, by the computer, an ICL of the ICL file as acceptable for electronic processing for at least one of payment and presentment for payment based on a first validation rule of the at least one validation rule;
invalidating, by the computer, another ICL of the ICL file for electronic processing for at least one of payment and presentment for payment based on the first validation rule of the at least one validation rule;

electronically processing at least one item of the validated ICL for at least one of payment and presentment for payment; and rejecting the another ICL for electronically processing for payment or presentment for payment.

27. The method of claim 26, wherein the step of rejecting the another ICL comprises rejecting each item of the another ICL.

28. The method of claim 26, further comprising the steps of:
validating or invalidating each ICL of the ICL file based on the first validation rule;
identifying a total number of invalidated ICLs of the ICL file and comparing the total number to a predefined threshold value; and
rejecting the ICL file if the total number of invalidated ICLs exceeds the predetermined threshold.

29. The method of claim 26, further comprising the steps of:
validating a bundle of the validated ICL as acceptable for electronic processing for at least one of payment and presentment for payment based on a second validation rule of the at least one validation rule; and
invalidating another bundle of the validated ICL for electronic processing for at least one of payment and presentment for payment based on the second validation rule of the at least one validation rule, wherein
the step of electronically processing at least one item of the validated ICL further comprises electronically processing the validated bundle and rejecting the another bundle.

30. The method of claim 29, wherein the step of rejecting the another bundle comprises rejecting each item of the another bundle.

31. The method of claim 29, further comprising the step of
validating or invalidating each bundle of the validated ICL based on the second validation rule;
identifying a total number of invalidated bundles of the validated ICL and comparing the total number to a predefined threshold value; and
rejecting the validated ICL if the total number of invalidated bundles exceeds the predetermined threshold.

32. The method of claim 29, further comprising the steps of:
validating an item of the validated bundle as acceptable for electronic processing for at least one of payment and presentment for payment based on a third validation rule of the at least one validation rule; and
invalidating another item of the validated bundle for electronic processing for at least one of payment and presentment for payment based on the third validation rule of the at least one validation rule, wherein
the step of electronically processing at least one item of the validated ICL further comprises electronically processing the validated item and rejecting the another item.

33. The method of claim 32, further comprising the steps of:
validating or invalidating each item of the validated bundle based on the third validation rule;
identifying a total number of invalidated items of the validated bundle and comparing the total number to a predefined threshold value; and
rejecting the validated bundle if the total number of invalidated items exceeds the predetermined threshold.

34. The method of claim 26, wherein the step of selecting at least one validation rule comprises selecting, from a plurality of validation rules, a set of validation rules based on a file type of the ICL file, data content of the ICL file, and an identity of a bank associated with the ICL file.

35. A computer-implemented system for validating electronic image cash letters ("ICLs"), comprising:
a communications network; and
a computer configured to
receive a first ICL and a second ICL over the communications network, each ICL comprising at least one check item comprising an electronic image of a check,
select, from a plurality of validation rules, a first set of validation rules to apply to the first ICL based on at least one of a file type of the first ICL and an identity of a bank associated with the first ICL,
select, from the plurality of validation rules, a second set of validation rules to apply to the second ICL based on at least one of a file type of the second ICL and an identity of a bank associated with the second ICL, the second set of validation rules being different than the first set of validation rules,
validate whether each check item in the first ICL is acceptable for electronic processing for at least one of payment and presentment for payment based on the first selected set of validation rules,
validate whether each check item in the second ICL is acceptable for electronic processing for at least one of payment and presentment for payment based on the second selected set of validation rules,
electronically process each check item in the first ICL and second ICL that is successfully validated as acceptable for at least one of payment and presentment for payment, and
reject each check item in the first ICL and second ICL that is not successfully validated as acceptable for at least one of payment and presentment for payment.

36. The system of claim 35, wherein the computer is further configured to:
generate a report comprising at least one result of the validation of the first ICL; and
transmit the report to the bank associated with the first ICL.

37. The system of claim 35, wherein the computer is further configured to:
receive the first ICL file from a customer,
identify a service level associated with the customer, and
select at least one validation rule based on the identified service level.

* * * * *